United States Patent
Kobayashi et al.

(10) Patent No.: US 7,911,078 B2
(45) Date of Patent: Mar. 22, 2011

(54) DUAL TYPE VEHICLE POWER-SUPPLY APPARATUS

(75) Inventors: Tetsuya Kobayashi, Anjo (JP); Shinya Goto, Gifu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/591,402

(22) Filed: Nov. 18, 2009

(65) Prior Publication Data
US 2010/0114394 A1  May 6, 2010

Related U.S. Application Data

(63) Continuation of application No. 11/260,158, filed on Oct. 28, 2005, now abandoned.

(30) Foreign Application Priority Data

Nov. 9, 2004 (JP) ................................. 2004-325003

(51) Int. Cl.
*B60L 3/00* (2006.01)
(52) U.S. Cl. ........................................ 307/9.1; 307/10.6
(58) Field of Classification Search .................... 307/9.1, 307/10.6
See application file for complete search history.

(56) References Cited

U.S. PATENT DOCUMENTS

| | | | |
|---|---|---|---|
| 5,804,947 | A | 9/1998 | Nii et al. |
| 6,034,507 | A | 3/2000 | Ikawa et al. |
| 6,639,384 | B2 | 10/2003 | Hasegawa et al. |
| 6,700,802 | B2 | 3/2004 | Ulinski et al. |
| 6,932,174 | B2 | 8/2005 | Hirata et al. |
| 7,057,376 | B2 | 6/2006 | Cook et al. |

FOREIGN PATENT DOCUMENTS

| JP | A-11-122824 | 4/1999 |
|---|---|---|
| JP | A-11-164494 | 6/1999 |
| JP | A-2002-176704 | 6/2002 |

*Primary Examiner* — Jared J Fureman
*Assistant Examiner* — Dru M Parries
(74) *Attorney, Agent, or Firm* — Oliff & Berridge, PLC

(57) ABSTRACT

The dual type vehicle power-supply apparatus includes a bidirectional power transmission unit capable of performing bidirectional electric power transmission between a high voltage source of a high power-supply voltage supply system and a low voltage source of a low power-supply voltage supply system, and a power transmission controller controlling the bidirectional power transmission unit to perform the bidirectional electric power transmission. The power transmission controller has a function of detecting a surplus amount of electric power in the low power-supply voltage supply system, a function of detecting a shortage amount of electric power in the high power-supply voltage supply system, and a function of commanding the bidirectional power transmission unit to transmit electric power from the low voltage source to the high voltage source by an mount equal to the detected shortage amount when the detected surplus amount is larger than the detected shortage amount.

9 Claims, 5 Drawing Sheets

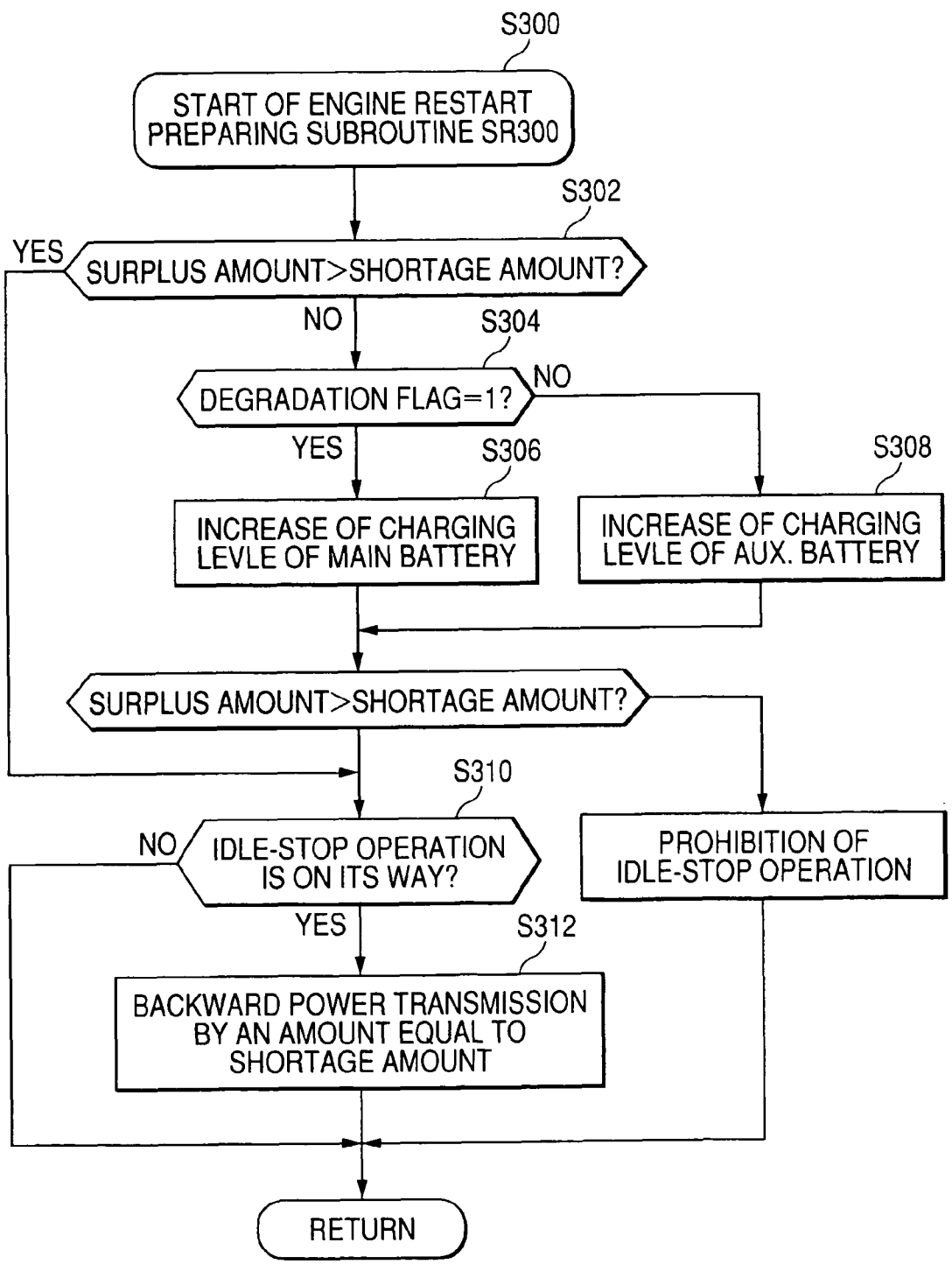

DUAL TYPE VEHICLE POWER-SUPPLY APPARATUS

CROSS-REFERENCE TO RELATED APPLICATION

This is a Continuation of application Ser. No. 11/260,158 filed Oct. 28, 2005. This application claims the benefit of Japanese Patent Application No. 2004-325003, filed on Nov. 9, 2004. The entire disclosures of the prior applications are hereby incorporated by reference herein in their entirety.

BACKGROUND OF THE INVENTION

1. Field of the Invention

The present invention relates to a dual type vehicle power-supply apparatus including a high power-supply voltage supply system and a low power-supply voltage supply system.

2. Description of Related Art

A dual type vehicle power-supply apparatus including two batteries providing different power supply voltages is used in a hybrid vehicle, for example. The high power-supply voltage supply system of such a dual type vehicle power-supply apparatus is intended to supply electric power to large electrical loads which are turned on and off at frequent intervals. By supplying electric power to such large electrical loads in high voltage, advantages of reduction of size and weight of a power feeding system and electrical loads, reduction of power transmission losses, and increase of the cycle life of the power supply apparatus can be obtained. The low power-supply voltage supply system is intended to supply electric power to electrical loads which require relatively small power in low voltage, such as electronic devices. Generally, a lead-acid vehicle battery, which is low in price and easy to replace, is used for the low power-supply voltage supply system.

It is common that the dual type vehicle power-supply apparatus is configured to generate a high voltage for its high power-supply voltage supply system, and produces a low voltage for its low power-supply voltage supply system by stepping down the generated high voltage by use of a DC-DC converter, for example.

In a hybrid vehicle, the high power-supply voltage supply system must supply a large amount of electric power for starting a vehicle engine very often. Accordingly, there is known a technique for transmitting electric power back to the high power-supply voltage supply system from the low voltage power-supply supply system to thereby increase the feeding capacity of the high power-supply voltage supply system before starting the engine, as disclosed in Japanese Patent Application Laid-open No. 2002-176704 filed by the same inventors of the present application. Such a technique makes it possible to downsize the high power-supply voltage supply system.

However, although the backward power transmission technique described above makes it possible to use a high power-supply voltage supply system having a smaller feeding capacity (smaller discharging capacity), it invites a problem that the lead-acid battery of the low power-supply voltage supply system, which is low in price and has a relatively short cycle life, reaches the end of its useful life too soon. In addition, the backward power transmission technique has another problem in that the fuel consumption of a vehicle is lowered by the power transmission loss produced during the backward power transmission.

SUMMARY OF THE INVENTION

The invention provides a dual type vehicle power-supply apparatus including:

a high power-supply voltage supply system having a high voltage source supplying a high power-supply voltage to a high voltage electrical load;

a low power-supply voltage supply system having a low voltage source supplying a low power-supply voltage lower than the high power-supply voltage to a low voltage electrical load;

a bidirectional power transmission unit capable of performing bidirectional electric power transmission between the high voltage source and the low voltage source; and a power transmission controller controlling the bidirectional power transmission unit to perform the bidirectional electric power transmission, wherein, the power transmission controller includes:

a first function of detecting a surplus amount of electric power in the low power-supply voltage supply system;

a second function of detecting a shortage amount of electric power in the high power-supply voltage supply system; and a third function of commanding the bidirectional power transmission unit to transmit electric power from the low voltage source to the high voltage source by an amount equal to the detected shortage amount when the detected surplus amount is larger than the detected shortage amount.

With the dual type vehicle power-supply apparatus of the invention configured to transmit electric power only by a required minimum amount when there is, or there is expected a power supply shortage in the high power-supply voltage supply system, the degradation of the auxiliary battery of the low power-supply system can be suppressed, and accordingly the electric power transmission loss caused by performing the backward stepup power transmission can be reduced to thereby improve the fuel consumption of the vehicle, because it is possible to avoid the backward stepup power transmission from being performed uselessly.

BRIEF DESCRIPTION OF THE DRAWINGS

In the accompanying drawings:

FIG. 5 is a flowchart showing the operation of an engine restart preparing subroutine included in the backward stepup power transmission routine.

PREFERRED EMBODIMENTS OF THE INVENTION

Figure 1:
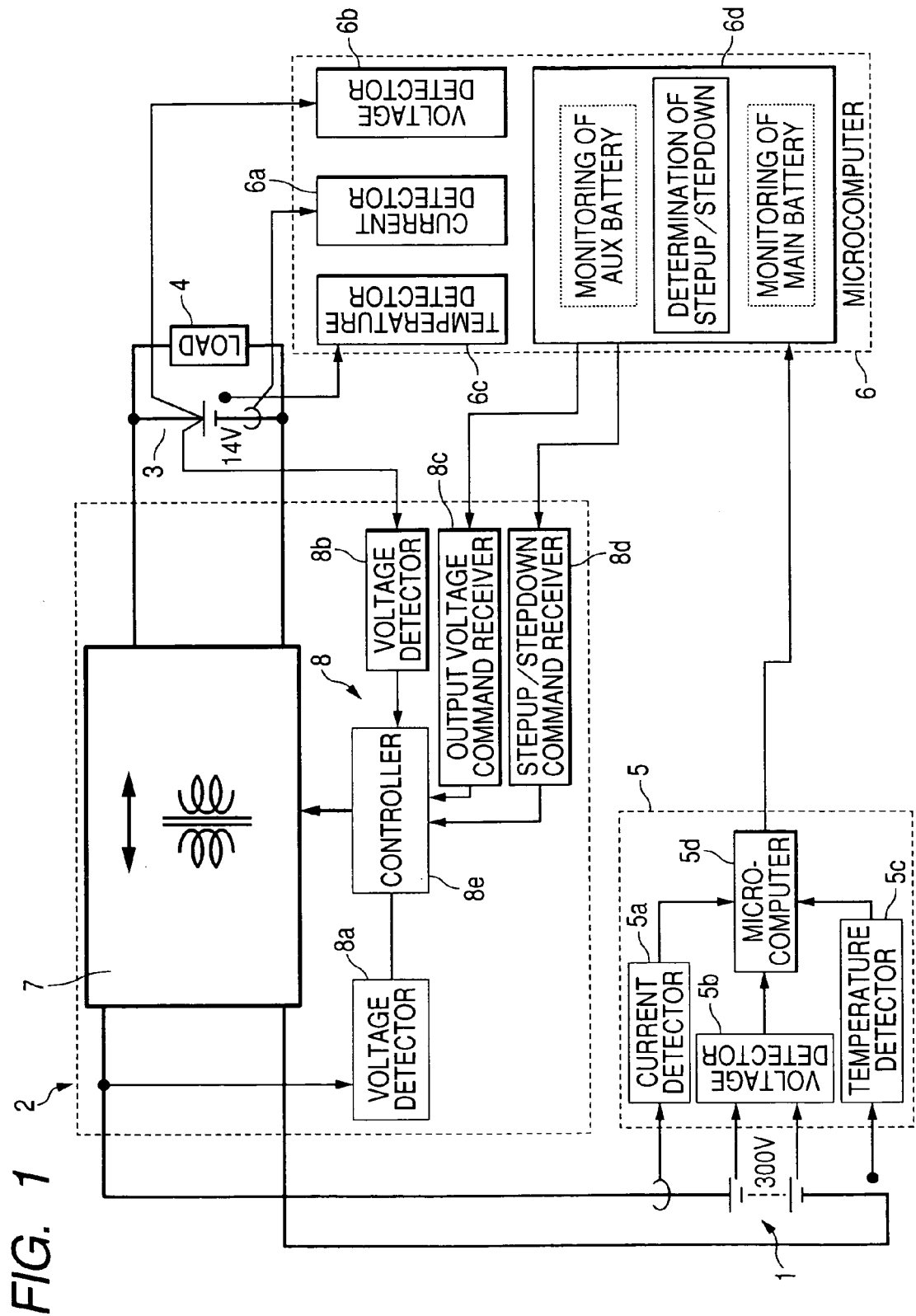
FIG. 1 is a diagram showing a configuration of a dual type vehicle power-supply apparatus according to an embodiment of the invention.

FIG. 1 is a diagram showing a configuration of a dual type vehicle-power supply apparatus according to an embodiment of the invention.

The dual type vehicle power-supply apparatus includes a main battery 1 having a rated output of about 300V, a bidirectional power transmission unit 2 of the input/output insulation type, an auxiliary battery 3 having a rated output of about 14V, and a battery monitor 5 for monitoring the state of the main battery 1. Reference numeral 4 denotes low voltage electrical loads, and 6 denotes a vehicle ECU (Engine Control Unit).

The main battery 1 constitutes a high power-supply voltage supply system together with an engine starter including an engine-driven/engine-starting generator/motor (not shown) and a vehicle-driving motor/generator (not shown). The high power-supply voltage supply system is connected to high voltage electrical loads (not shown) consuming relatively large amounts of electrical power.

The auxiliary battery 3, which is a conventional lead-acid vehicle battery, constitutes a low power-supply voltage supply system together with the low voltage electrical loads 4.

The bidirectional power transmission unit 2, which is capable of performing two-way electrical power transmission between the high power-supply voltage supply system and the low power-supply voltage supply system, includes a bidirectional DC-DC converter 7, a voltage detector 8a detecting an input voltage of the DC-DC converter 7 (the voltage supplied from the main battery 1), a voltage detector 8b detecting an output voltage of the DC-DC converter 7 (the voltage supplied to the auxiliary battery 3), an output voltage command receiver 8c receiving an output voltage command sent from the ECU 6, a stepup/stepdown command receiver 8d receiving a stepup/stepdown command sent from the ECU 6, and a controller 8e for controlling the entire operation of the bidirectional power transmission unit 2.

The battery monitor 5 has, in addition to a conventional function of measuring the voltage, load current and temperature of the main battery 1 and informing the ECU 6 of the measured results, a battery management function of detecting overcharging and overdischarging of the main battery 1 for each of the battery modules of the main battery 1 and informing the ECU 6 of the detection results. The battery monitor 5 is constituted by a current detector 5a detecting a load current of the main battery 1, a voltage detector 5b detecting the terminal voltage of the main battery 1, a temperature detector 5c detecting the temperature of the main battery 1, and a microcomputer 5d controlling the entire operation of the battery monitor 5.

The ECU 6, which is a microcomputer-based controller, has, in addition to a conventional function of detecting the state of the vehicle and controlling the operation of the vehicle in accordance with the detected vehicle state, a function of controlling the power transmission operation of the bidirectional DC-DC converter 7 through the controller 8e on the basis of the state of the main battery 1 detected by the battery monitor 5 and the state of the low power-supply voltage supply system which the ECU 6 itself detects. The ECU 6 includes a current detector 6a detecting a load current of the auxiliary battery 3, a voltage detector 6b detecting the terminal voltage of the auxiliary battery 3, a temperature detector 6c detecting the temperature of the auxiliary battery 3, and a microcomputer 6d controlling the entire operation of the ECU 6. The microcomputer 6d of the ECU 6 calculates a target terminal voltage of the auxiliary battery 3 on the basis of the state of the auxiliary battery 1 (the actual terminal voltage, load current, and temperature of the auxiliary battery 3) and the state of the main battery 3 (the terminal voltage, load current, and temperature of the main battery 3), and sends the calculated target terminal voltage to the bidirectional power transmission unit 2 as the output voltage command.

The controller 8e controls the bidirectional DC-DC converter 7 to perform a forward stepdown power transmission such that the terminal voltage of the auxiliary battery 3 becomes equal to the target terminal voltage in response to the output voltage command. Since the configuration of the bidirectional DC-DC converter 7 and the forward stepdown power transmission operation thereof are well known, no further explanation is made here.

Next, explanation is made about the operation of the dual type vehicle power-supply apparatus of this embodiment when it performs the backward stepup power transmission. The backward stepup power transmission routine is performed before restarting the engine after the vehicle is idle-stopped. In the case of a hybrid vehicle, preferably, the backward stepup power transmission routine is performed periodically after the ignition key is turned on.

Figure 2:
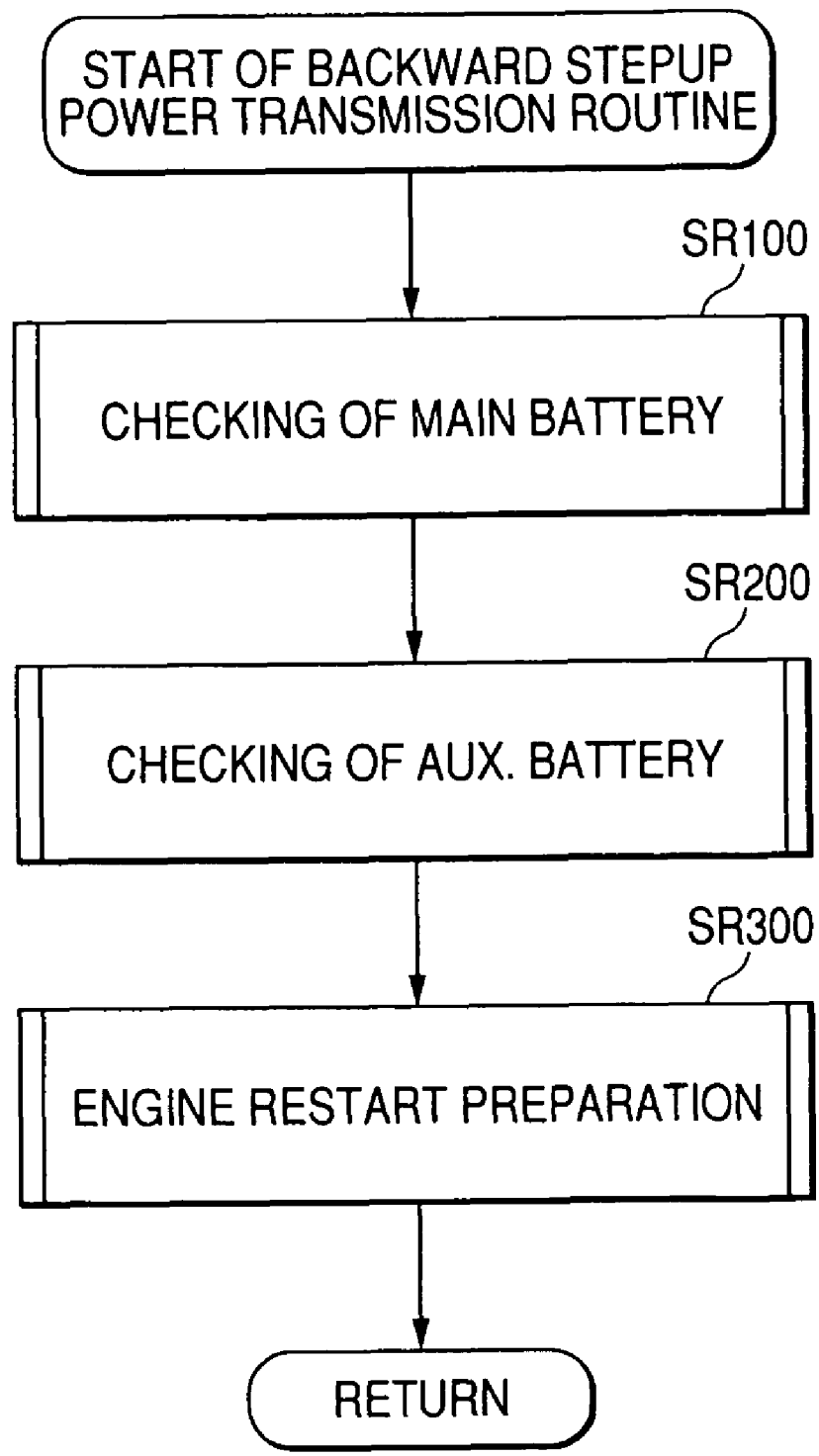
FIG. 2 is a flowchart showing the operation of a backward stepup power transmission routine performed by the dual type vehicle power-supply apparatus.

As shown in FIG. 2, when the backward stepup power transmission routine is initiated, the main battery 1 is checked by a main battery checking subroutine SR100. Subsequently, the auxiliary battery 3 is checked by an auxiliary battery checking subroutine SR200. Finally, preparation for the engine restart in terms of electric power supply is made by an engine restart preparing subroutine SR300.

Figure 3:
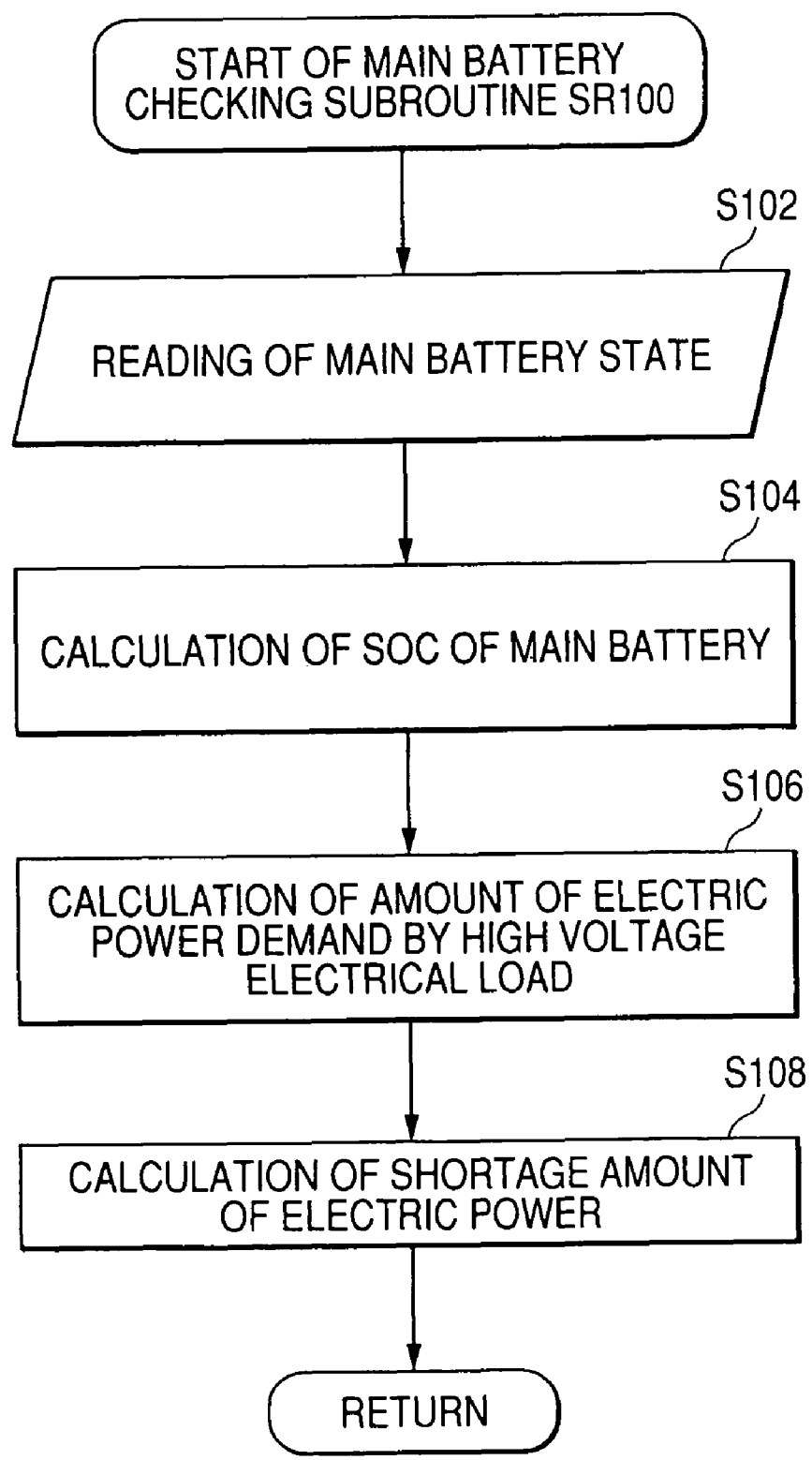
FIG. 3 is a flowchart showing the operation of a main battery state checking subroutine included in the backward stepup power transmission routine.

FIG. 3 is a flowchart showing the operation of the main battery checking subroutine SR100. As shown in this figure, when the main battery checking subroutine SR100 is initiated, the state of the main battery 1 (the terminal voltage, load current, and temperature of the main battery 1) are read at step S102. Subsequently, the SOC (State Of Charge) of the main battery 1 is calculated at step S104 as a measure representing a suppliable electric power amount of the main battery 1 on the basis of the state of the main battery 1. Alternatively the SOC may be calculated by integrating the load current of the main battery 1. Next, an amount of an impending electric power demand by the high voltage electrical loads is calculated at step S106. Finally, before returning to the main routine (the backward stepup power transmission routine), a prospective shortage amount of electric power in the high power-supply voltage supply system is calculated at step S108 by subtracting the amount of the impending electric power demand from the SOC (suppliable electric power amount) of the main battery 1.

In this embodiment, the SOC of the main battery 1 means an amount of practically dischargeable electric energy stored in the main battery 1 and not the absolute capacity of the main battery 1. And the amount of the impending electrical power demand means an electric power amount needed for restarting the engine. Since the electric power amount needed for restarting the engine depends on the temperature of the engine, it is desirable to provide a map containing a relationship between the engine temperature and the required electric power amount.

Figure 4:
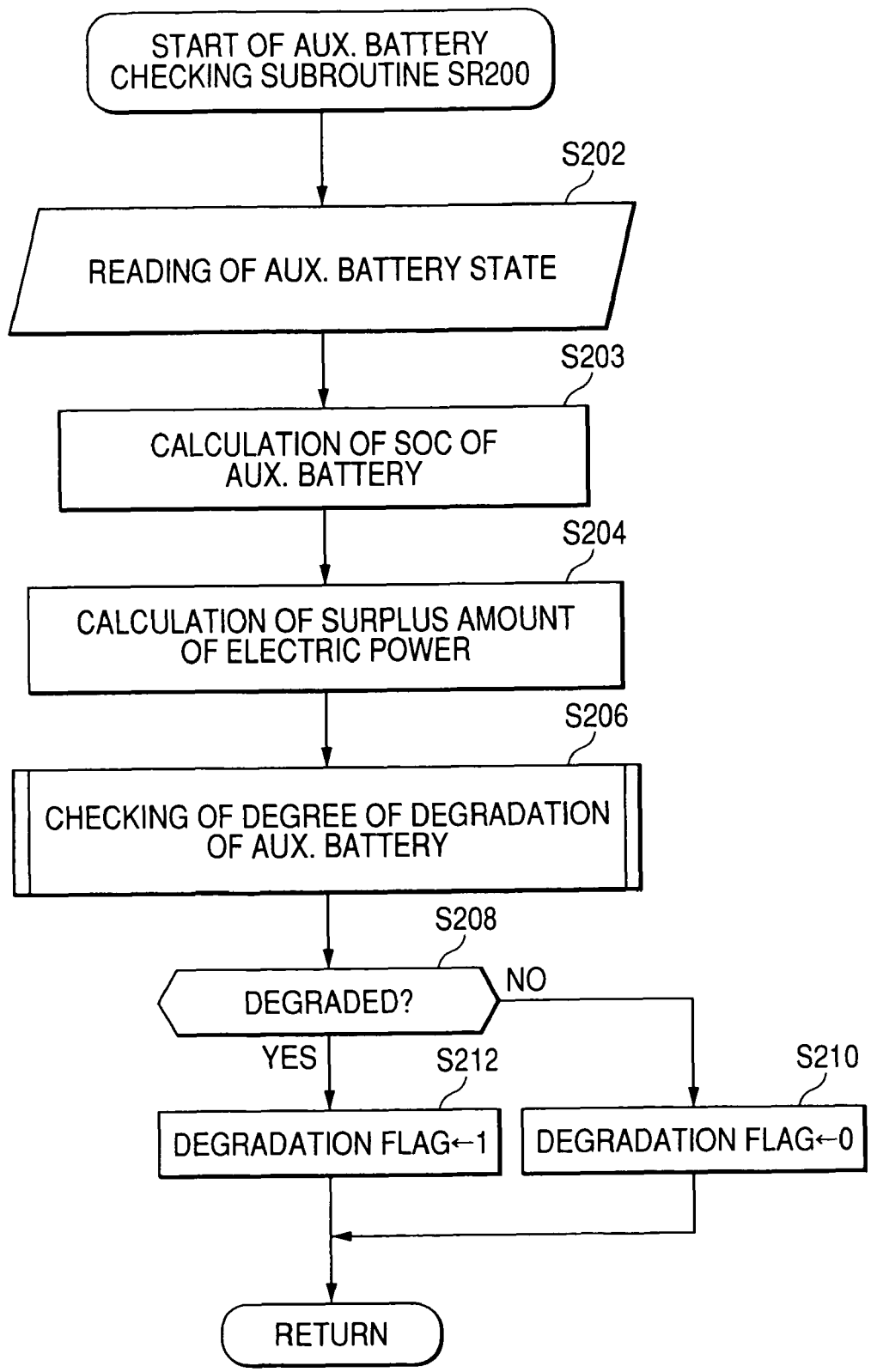
FIG. 4 is a flowchart showing the operation of an auxiliary battery state checking subroutine included in the backward stepup power transmission routine.

FIG. 4 is a flowchart showing the operation of the auxiliary battery checking subroutine SR200. As shown in this figure, when the auxiliary battery checking subroutine SR200 is initiated, the state of the auxiliary battery 3 (the terminal voltage, load current and temperature of the auxiliary battery 3) is read at step S202. Subsequently, the SOC of the auxiliary battery 3 is calculated at step 5203 as a measure representing a suppliable electric power amount of the auxiliary battery 3 on the basis of the state of the auxiliary battery 3. After that, a surplus amount of electric power is calculated at step S204 by subtracting, from the calculated suppliable electric power amount of the auxiliary battery 3, an amount of electric power which the low voltage electrical loads 4 needs for a certain time period after the forward stepdown power transmission from the high power-supply voltage supply system to the low power-supply voltage supply system is stopped, and multiplying the subtraction result by the power transmission efficiency of the bidirectional DC-DC converter 7 when it performs the backward stepup power transmission.

After that, a degree of degradation of the auxiliary battery 3 is checked at step S206. If it is determined at the subsequent step S 208 that the checked degree of the degradation is such that the amount of the actually dischargeable electric power of the auxiliary battery 3 is substantially smaller than the calculated suppliable electric power corresponding to the SOC of the auxiliary battery 3, a degradation flag is set to 1 at step S212, and if not, the degradation flag is reset to 0 at step S210 before returning to the main routine.

The degree of degradation of the auxiliary battery 3 can be detected, for example, by measuring the time elapsed until the terminal voltage of the auxiliary battery 3 which is supplying electric power to the low voltage electrical loads 4 falls to a certain value after the forward stepdown power transmission is stopped.

FIG. 5 is a flowchart showing the operation of the engine restart preparing subroutine SR300. As shown in this figure, when the engine restart preparing subroutine SR300 is initiated, it is checked at step S302 whether or not the surplus amount of electric power in the low power-supply voltage supply system obtained through the auxiliary battery checking subroutine SR200 is larger than the prospective shortage amount of electric power in the high power-supply voltage supply system obtained through the main battery checking subroutine SR100. If the check result at step S302 is negative, it is checked whether the degradation flag is in the set state or in the reset state. If it is found that the degradation flag is in the set state, the main battery 1 is charged at step 5306 to such a level as to remove the prospective shortage amount of electric power. If it is found that the degradation flag is in the reset state, the auxiliary battery 3 is charged at step 5308 to such a level as to remove the prospective shortage amount of electric power by performing the forward stepdown power transmission. However, if the terminal voltage of the auxiliary battery 3 exceeds a certain allowable limit while it is charged, the forward stepdown power transmission is stopped halfway, and the main battery 1 is charged to make up for the rest. After the main battery 1 or auxiliary battery 3 is charged, it is checked again at step S 307 whether or nor the surplus amount of electric power is larger than the prospective shortage amount of electric power.

If the check result at step S307 is affirmative, it is checked whether or not the engine idle stop operation is on its way at step S310. If the check result at step S310 is affirmative, before returning to the main routine, the backward stepup power transmission is carried out for transmitting electric power from the low power-supply voltage supply system to the high power-supply voltage supply system by an amount equal to the calculated prospective shortage amount of electric power plus a certain margin. This margin is determined to cover the charging and discharging losses of the main battery 1 and electrical power transmission losses. The amount of the electric power being transmitted through the backward stepup power transmission can be calculated on the basis of the output current and output voltage of the DC-DC converter 7, or the load current and the terminal voltage of the main battery 1 or the auxiliary 3.

On the other hand, if the check result at step S307 is negative, the idle stop operation is prohibited from being performed at step S309, and after that, return to the main routine is made.

The above engine restart preparing subroutine SR300 may be added with a step at which, if it is determined at step S307 that the surplus amount of electric power in the low power-supply voltage supply system is not larger than the prospective shortage amount of electric power in the high power-supply voltage supply system, the prospective shortage amount of electric power is temporarily reduced, or the surplus amount of electric power is temporarily increased. The temporal reduction of the prospective shortage amount of electric power can be made by temporarily interrupting supply of electric power to high voltage electrical loads not essential for the engine restart operation. Likewise, the temporal increase of the surplus amount of electric power can be made by temporarily interrupting supply of electric power to low voltage electrical loads not essential for the engine restart operation such as head lights.

As explained above, the dual type vehicle power-supply apparatus according to the embodiment of the invention is configured to transmit electric power only by a required minimum amount when there is, or there is expected a power supply shortage in the high voltage supply stem. Accordingly, with this dual type vehicle power-supply apparatus, the degradation of the auxiliary battery can be suppressed, and accordingly the electric power transmission loss caused by performing the backward stepup power transmission can be reduced to thereby improve the fuel consumption of the vehicle, because it is possible to avoid the backward stepup power transmission from being performed uselessly.

It is needless to say that many modifications can be made in the above described embodiment as described below.

The bidirectional DC-DC converter 7 may be replaced by a pair of unidirectional DC-DC converters.

The battery monitor 5 may be so configured as to monitor the state of the auxiliary battery 3 in place of the ECU 6.

The battery monitor 5 may be integrated with the bidirectional power transmission unit 2.

Although the present embodiment is directed to a hybrid vehicle having the idle-stop function, the present invention can be applied to any normal vehicle having the idle-stop function.

The control of the backward stepup power transmission may be performed by hardware process instead of software process by the microcomputer.

The above explained preferred embodiments are exemplary of the invention of the present application which is described solely by the claims appended below. It should be understood that modifications of the preferred embodiments may be made as would occur to one of skill in the art.

What is claimed is:

1. A dual type vehicle power-supply apparatus comprising:
    a high voltage power supply including a generator and a high voltage rechargeable battery charged by said generator;
    a high voltage system including an engine starter supplied with electric power from said high voltage power supply;
    a low voltage power supply including a low voltage rechargeable battery whose output voltage is lower than an output voltage of said high voltage rechargeable battery;
    a low voltage system including a low-voltage electrical load supplied with electric power from said low voltage power supply;
    a bidirectional power transmission unit connecting said high voltage power supply and said low voltage power supply to each other such that electric power can be transmitted between said high voltage power supply and said low voltage power supply; and
    a power transmission controller which controls transmission of electric power between said high voltage power supply and said low voltage power supply through said bidirectional power transmission unit;

wherein said power transmission controller is configured to:

calculate an engine starting electric power amount necessary to start an engine with an idle stop function;

calculate a difference between a charge amount of said high voltage power supply and said engine starting electric power as an electric power shortage amount;

detect, as a surplus electric power amount, an electric power amount which said low voltage power supply can afford to supply other than an electric power to be supplied to said low-voltage electrical load;

determine whether said surplus electric power amount is greater or less than said shortage electric power amount;

command said bidirectional power transmission unit to transmit electric power from said low voltage power supply to said high voltage power supply when said surplus electric power amount is determined to be greater than said shortage electric power amount; and disable said idle-stop function when said surplus electric power amount is determined to be less than said shortage electric power amount.

2. The dual type vehicle power-supply apparatus according to claim 1, wherein the power transmission controller is configured to determine whether the surplus electric power amount is less than the shortage electric power amount and to increase a charge amount of the high voltage rechargeable battery of the high voltage power supply based on the determination.

3. The dual type vehicle power-supply apparatus according to claim 1, wherein the power transmission controller is configured to determine whether the electric power surplus amount is greater than a predetermined value or whether a remaining power supply capacity of the low voltage power supply is greater than a predetermined value and to increase a charge amount of the low voltage rechargeable battery of the low voltage power supply based on the determination.

4. The dual type vehicle power-supply apparatus according to claim 1, wherein the power transmission controller is configured to determine whether the surplus electric power amount is less than the shortage electric power amount and to increase a charge amount of the low voltage rechargeable battery of the low voltage power supply based on the determination.

5. The dual type vehicle power-supply apparatus according to claim 2, wherein, after the charge amount of the high voltage rechargeable battery is increased, the power transmission controller again determines whether the surplus electric power amount is greater or less than the shortage electric power amount.

6. The dual type vehicle power-supply apparatus according to claim 4, wherein, after the charge amount of the low voltage rechargeable battery is increased, the power transmission controller again determines whether the surplus electric power amount is greater or less than the shortage electric power amount.

7. The dual type vehicle power-supply apparatus according to claim 1, wherein the power transmission controller is configured to determine whether the surplus electric power amount is less than the shortage electric power amount and at least one of the electric power surplus amount is less than a predetermined value or remaining power supply capacity of the low voltage power supply is less than a predetermined value and to increase a charge amount of the high voltage rechargeable battery of the high voltage power supply based on the determination.

8. The dual type vehicle power-supply apparatus according to claim 7, wherein the power transmission controller is configured to determine whether the surplus electric power amount is less than the shortage electric power amount and at least one of the electric power surplus amount is greater than a predetermined value or a remaining power supply capacity of the low voltage power supply is greater than a predetermined value and to increase a charge amount of the low voltage rechargeable battery of the low voltage power supply based on the determination.

9. The dual type vehicle power-supply apparatus according to claim 8, wherein after the charge amount of the high voltage rechargeable battery or the low voltage rechargeable battery is increased the power transmission controller again determines whether the surplus electric power amount is greater or less than the shortage electric power amount.

* * * * *